No. 876,614. PATENTED JAN. 14, 1908.
W. E. WINGATE.
MACHINE FOR MAKING FALSE REEDS FOR LOOMS.
APPLICATION FILED JULY 27, 1905.
7 SHEETS—SHEET 1.
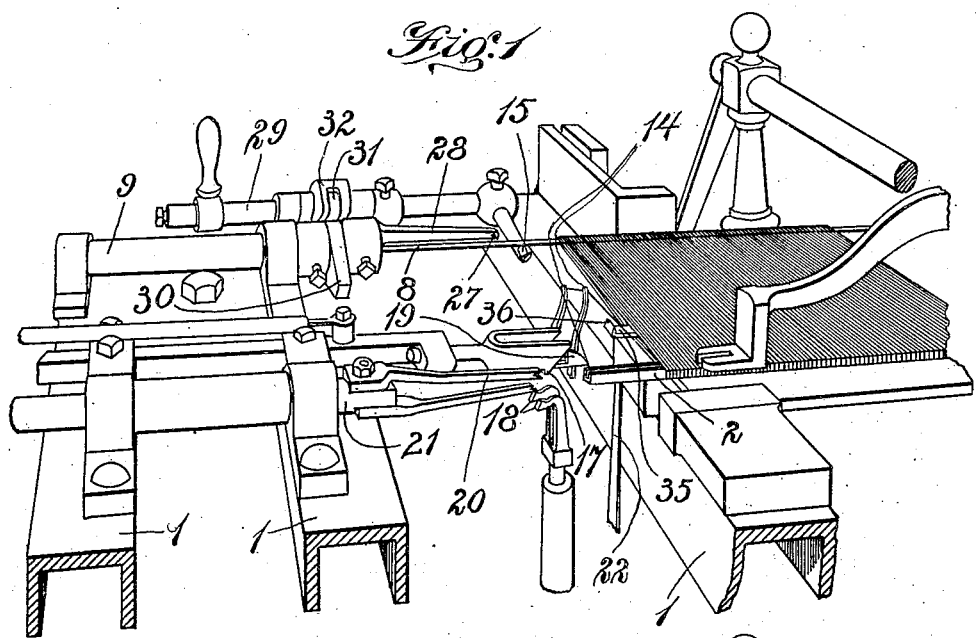
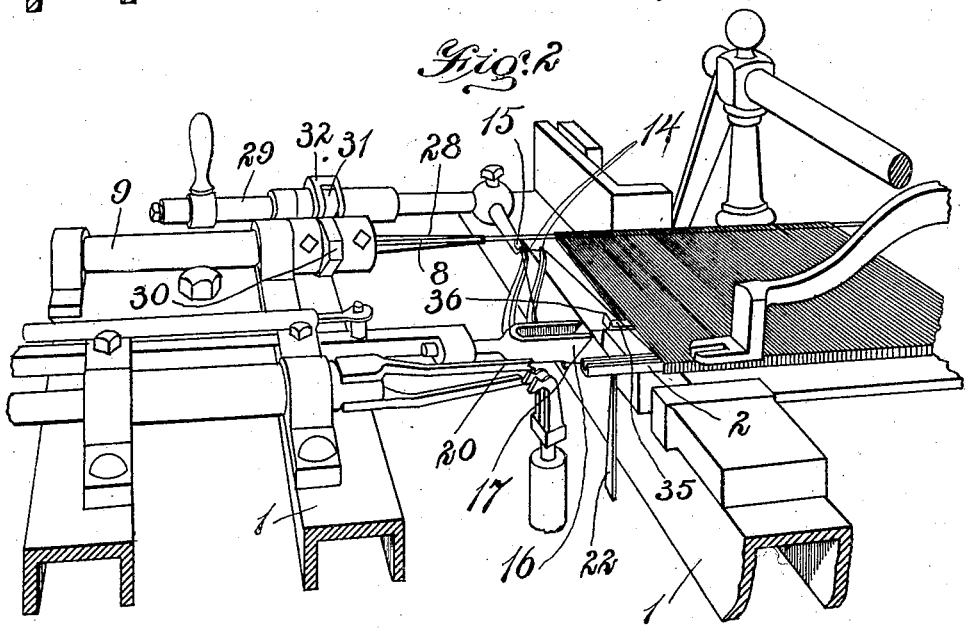

No. 876,614. PATENTED JAN. 14, 1908.
W. E. WINGATE.
MACHINE FOR MAKING FALSE REEDS FOR LOOMS.
APPLICATION FILED JULY 27, 1905.

7 SHEETS—SHEET 2.

Witnesses:
H. L. Robbins
A. C. Ratigan

Inventor.
Wilbur E. Wingate
By Wright, Brown,
Quimby & May
Attorneys.

No. 876,614. PATENTED JAN. 14, 1908.
W. E. WINGATE.
MACHINE FOR MAKING FALSE REEDS FOR LOOMS.
APPLICATION FILED JULY 27, 1905.
7 SHEETS—SHEET 3.
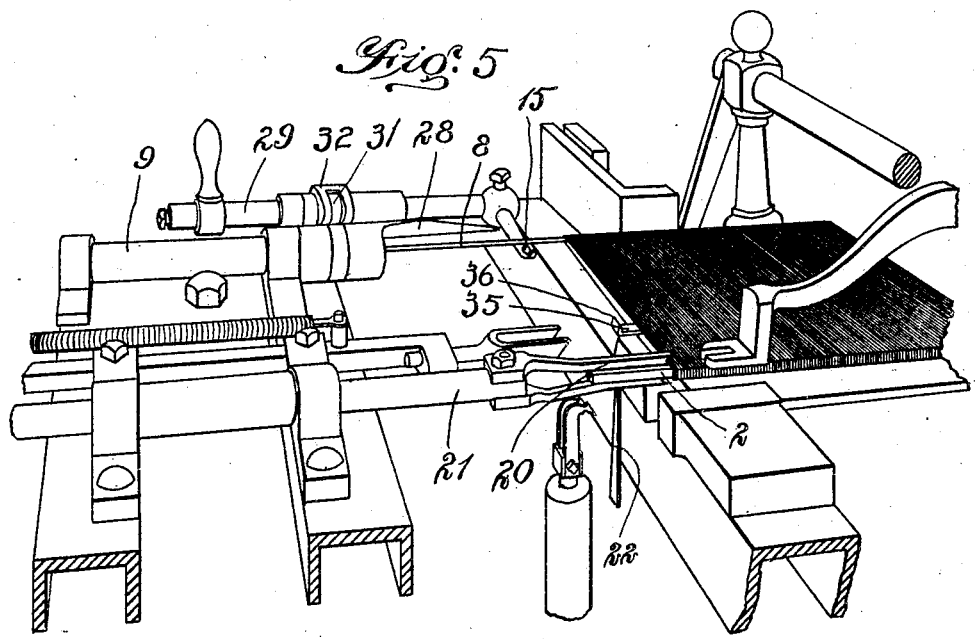
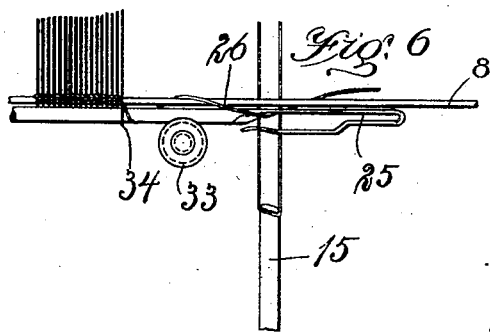
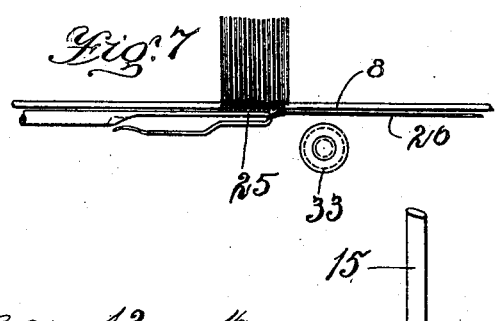
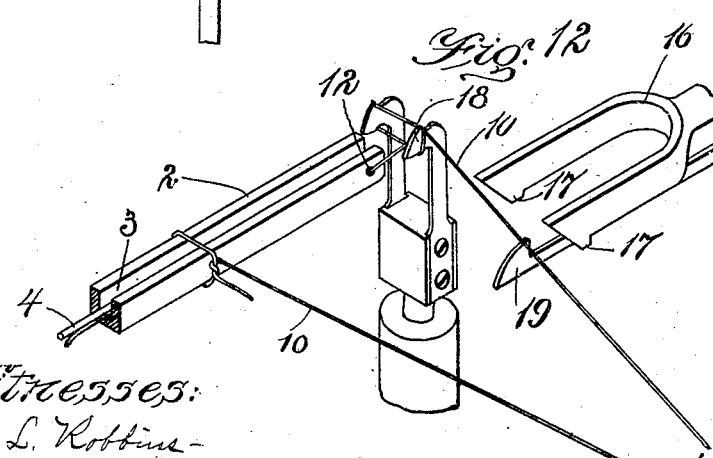
Witnesses:
H. L. Robbins
A. C. Ratigan
Inventor:
Wilbur E. Wingate
by Wright, Brown,
Quimby & May
Attorneys No. 876,614.
PATENTED JAN. 14, 1908.
W. E. WINGATE.
MACHINE FOR MAKING FALSE REEDS FOR LOOMS.
APPLICATION FILED JULY 27, 1905.
7 SHEETS—SHEET 4.
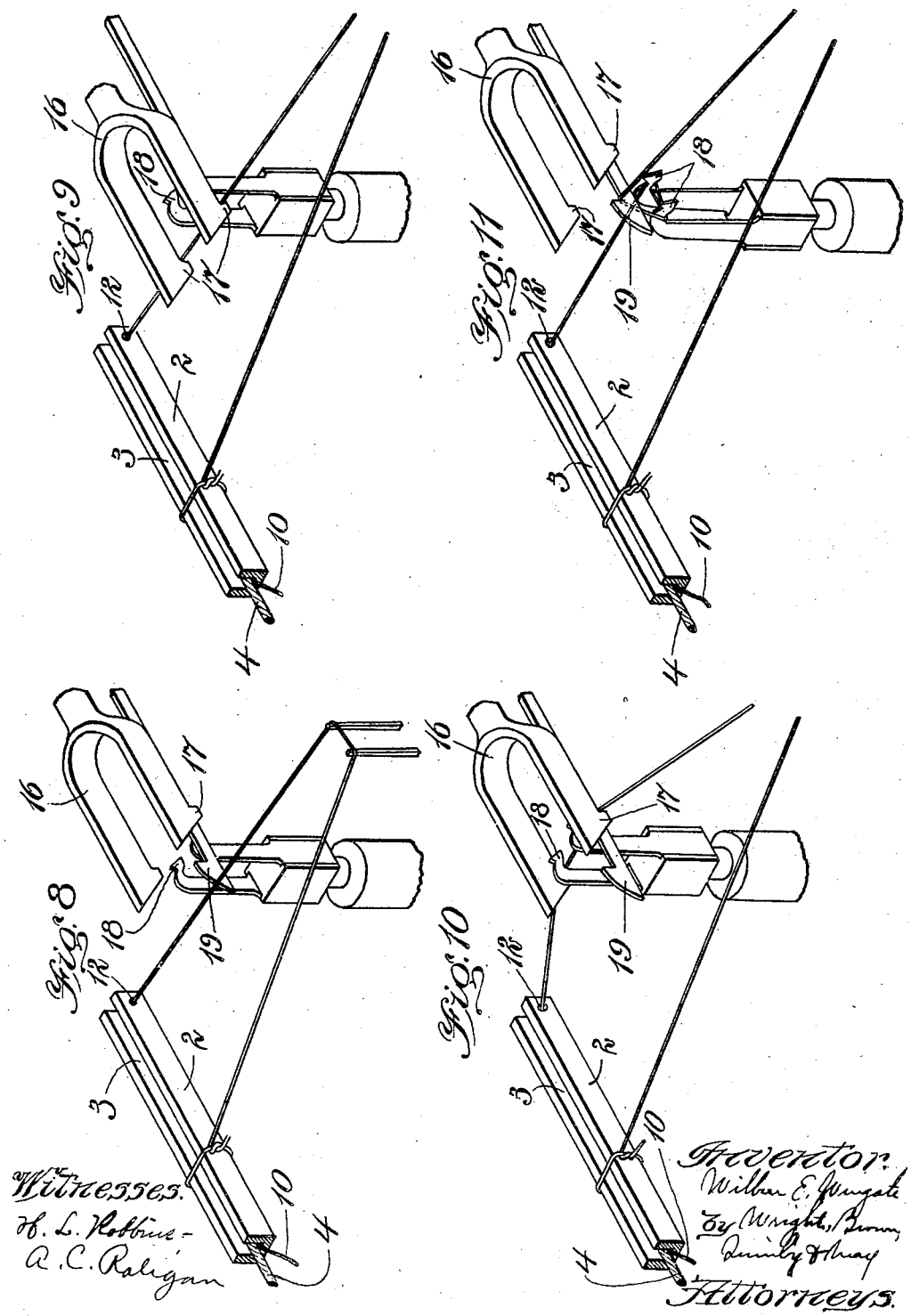

No. 876,614. PATENTED JAN. 14, 1908.
W. E. WINGATE.
MACHINE FOR MAKING FALSE REEDS FOR LOOMS.
APPLICATION FILED JULY 27, 1905.
7 SHEETS—SHEET 5.
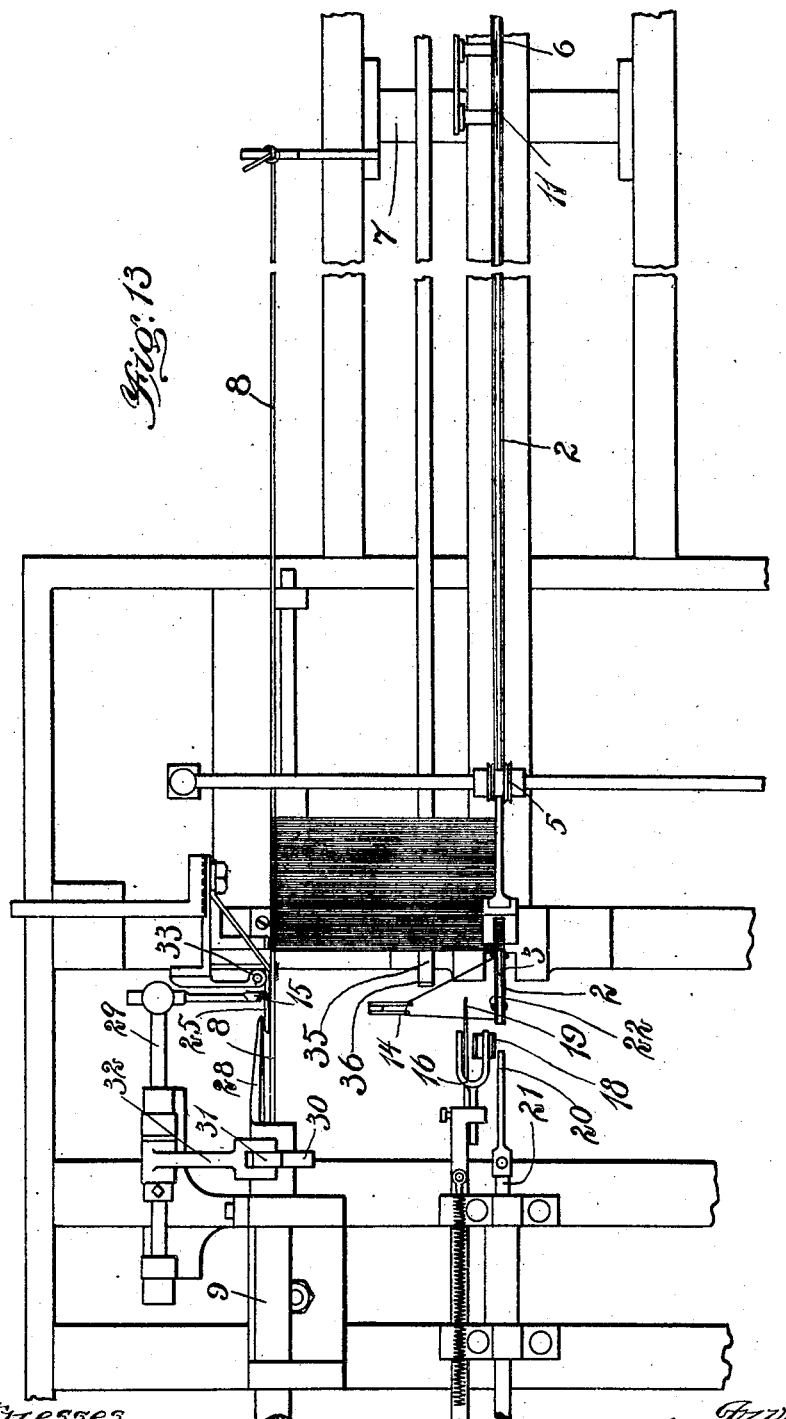

No. 876,614. PATENTED JAN. 14, 1908.
W. E. WINGATE.
MACHINE FOR MAKING FALSE REEDS FOR LOOMS.
APPLICATION FILED JULY 27, 1905.
7 SHEETS—SHEET 6.
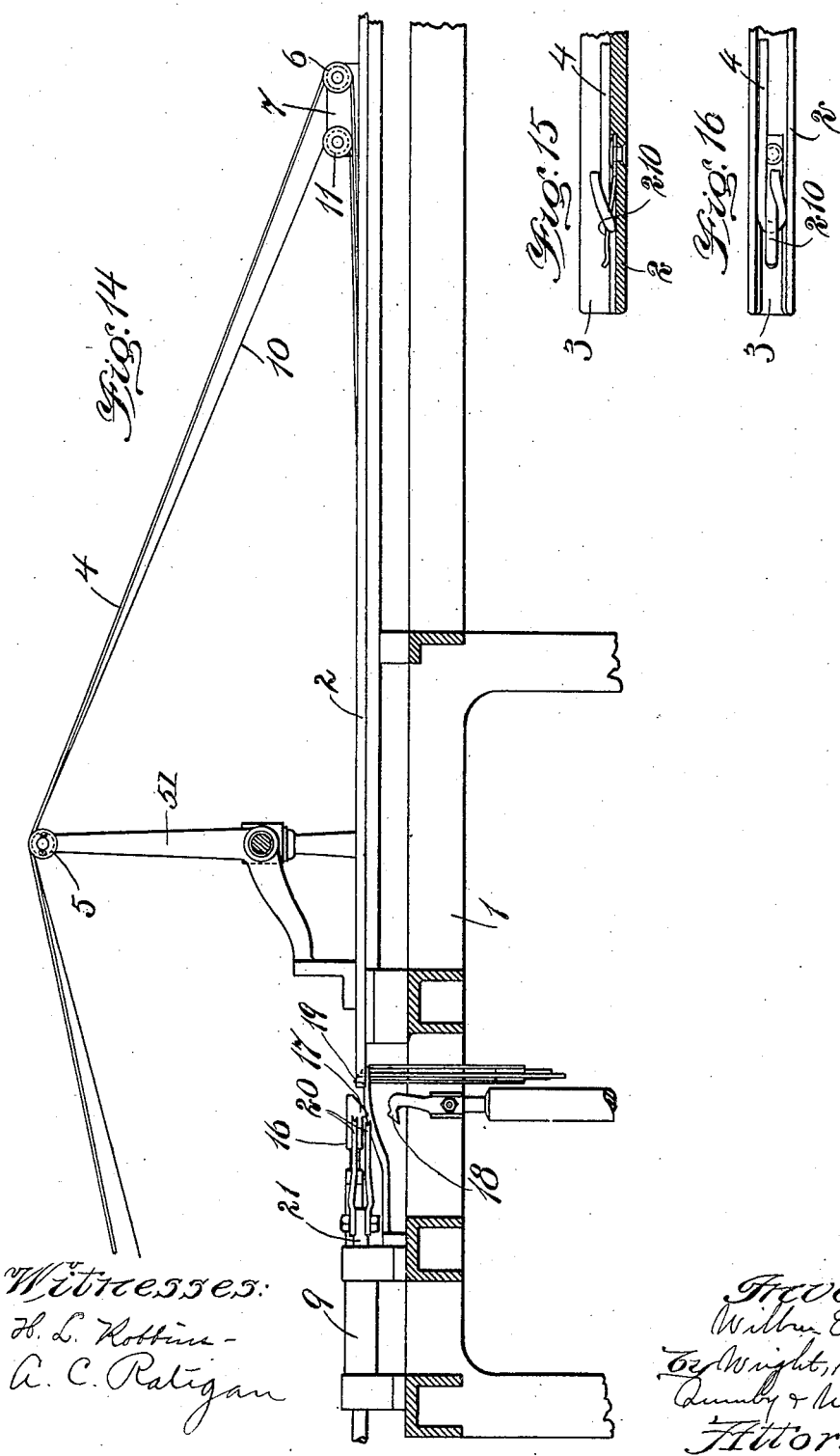

No. 876,614. PATENTED JAN. 14, 1908.
W. E. WINGATE.
MACHINE FOR MAKING FALSE REEDS FOR LOOMS.
APPLICATION FILED JULY 27, 1905.
7 SHEETS—SHEET 7.

Witnesses:
H. L. Robbins
A. C. Ratigan

Inventor:
Wilbur E. Wingate
by Wright, Brown,
Quimby & May
Attorneys.

THE NORRIS PETERS CO., WASHINGTON, D. C.

UNITED STATES PATENT OFFICE.

WILBUR E. WINGATE, OF LAWRENCE, MASSACHUSETTS, ASSIGNOR OF ONE-HALF TO EMMONS LOOM HARNESS COMPANY, OF LAWRENCE, MASSACHUSETTS, A CORPORATION OF MASSACHUSETTS.

MACHINE FOR MAKING FALSE REEDS FOR LOOMS.

No. 876,614.

Specification of Letters Patent.

Patented Jan. 14, 1908.

Application filed July 27, 1905. Serial No. 271,434.

*To all whom it may concern:*

Be it known that I, WILBUR E. WINGATE, of Lawrence, in the county of Essex and State of Massachusetts, have invented certain new and useful Improvements in Machines for Making False Reeds for Looms, of which the following is a specification.

This invention has for its object to provide a machine capable of making a false reed for looms of the kind illustrated and described in the patent granted to me February 13, 1906, numbered 812,316, adapted for use in silk manufacture.

The invention consists in a machine having the features and instrumentalities which I will now proceed to describe and claim.

Figure 3:
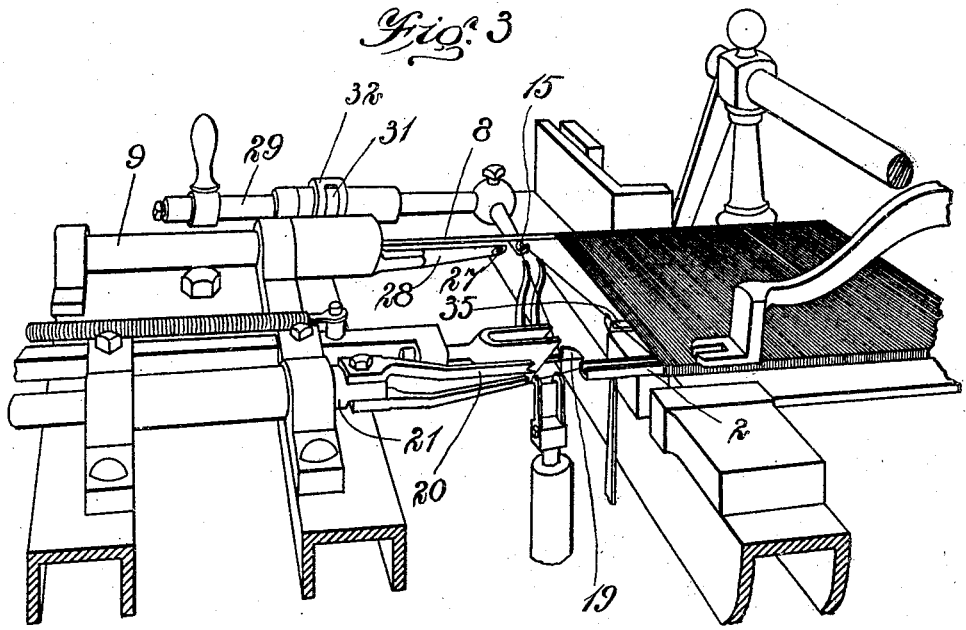
Figure 4:
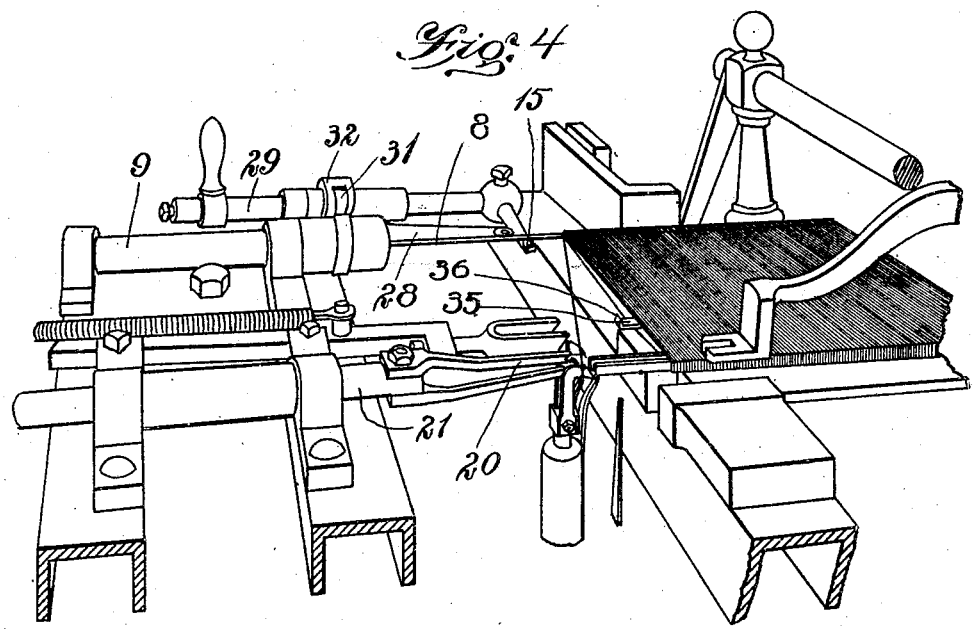
Figure 17:
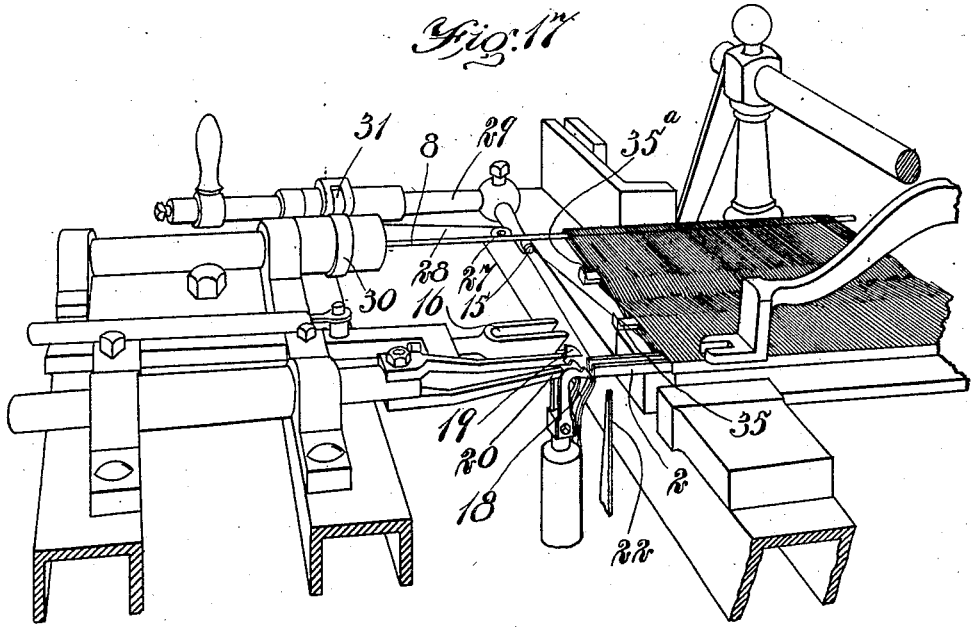
Figure 18:
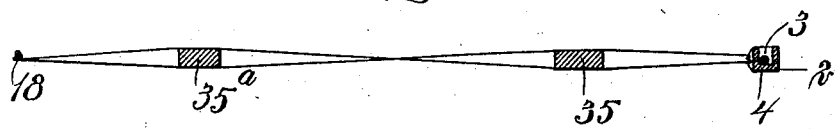

In the drawings forming a part of this application—Figures 1 to 5 mounted on a standard rising from frame 1, inclusive represent perspective views of the machine, showing the operating parts in the different positions which they occupy in knitting the false reed, Fig. 1 showing the commencement of one cycle of operation in knitting the reed, and Fig. 5 showing its conclusion, the other figures illustrating intermediate stages. Figs. 6 and 7 represent detail views illustrating the manner of braiding the thread of which the reed is composed upon the cords. Figs. 8 to 12 inclusive, show on an enlarged scale details of the mechanism for forming the knot in the thread over the eye needle in different positions which they occupy in making the same. Fig. 13 represents a plan. Fig. 14 represents a longitudinal sectional elevation, showing the operating parts in the position they occupy in Fig. 1, and also showing additional parts. Figs. 15 and 16 represent respectively, longitudinal sectional and plan views of the end of the eye needle, showing the device for retaining therein the end of the cord forming one side of the reed. Fig. 17 represents a modified form of machine capable of making a false reed with crossed threads. Fig. 18 represents a section of the same taken across that part on which the false reed is held.

The same reference characters indicate the same parts in all the figures.

In the drawings, 1 represents the frame of the machine, upon which is mounted a stationary eye needle 2, having a longitudinal channel 3 on its upper side. A cord 4 is passed over a stationary guide roll 5 mounted on a standard rising from the frame 1 and over a guide roll 6 carried by a movable carriage 7, from which it is carried forward through the channel in the eye needle, being held in the forward end of the latter by a spring clip 210 secured in the channel of the eye needle under which the end of the cord is slipped. This cord constitutes one of the sides of the false reed. The cord 8 forming the other side of the false reed is extended through a guide 9 and is drawn through the guide from a supply not shown, toward the rear.

The transverse thread or cord 10 is passed over the guide roll 11 on the carriage 7, a portion of its length being contained in the eye needle 2, and is drawn out through an opening 12 in the side of the eye needle near the forward end thereof as it is needed. This thread is drawn through the eye needle and over the guide rolls from a supply not shown, and carried across between and around the cords 4 and 8, being knotted about the former and braided to the other to form the threads of the false reed.

14 represents forks which are moved laterally between the cords 4 and 8 and carry a bight of thread from the eye needle toward the cord 8, drawing the thread through the opening 12 in said eye needle as they move, and engaging the end of the bight with the hook on the end of a spoon 15 which projects transversely beneath the cord 8. While the forks are thus moving, a pull-back 16 having two laterally separated projections 17 on its under surface is advanced and caused to pass over and catch the length of thread nearest it, that is, the stretch which extends from the opening 12 to the forks, after which the pull-back is retracted to carry the thread longitudinally of the machine beyond the end of the needle. When the pull-back is retracted a jack or knot-maker 18, having laterally-extending headed projections formed with inclined cam surfaces on their ends, somewhat separated from each other, and so positioned as to be able to extend between the teeth 17 of the pull-back, is raised and moved so that its projections extend over the length of thread engaged by the pull-back, the projections being extended toward the front of the machine, then the jack is lowered and given a half revolution toward the right, the thread being at this point held up by a finger 19 which projects between and below the teeth 17 of the pull-back. These movements of the knot-maker form a loop extending about the projections 18 which are then moved into line with the needle so that the loop is opposite the end of the eye needle and closely adjacent the same, whereupon two plungers 20, arranged one vertically above the other and extending toward the rear of the machine, being rigidly mounted upon the rod 21, are advanced between the teeth or projections of the jack 18 and caused to engage the sides of the loop, forcing the latter over the end of the eye needle. Fig. 12 shows both the loop after it has been thus threaded upon the eye needle and another loop immediately before being placed upon the needle, while Fig. 11 shows the knot-maker after it has been partly rotated and the loop is partly formed.

22 represents an opener having an up-and-down and also a lateral movement, being arranged to rise immediately after a loop has been forced over the end of the eye needle in the manner just described and entering between the side of the eye needle and the thread leading from the loop just formed to the opening 12, thereupon being moved laterally toward the other cord 8, drawing off enough thread from the eye needle to form a bight into which the forks 14 may project.

While the loop is being formed in the manner just described, the forks carry the bight of thread over to the spoon 15, deposit the same thereon, and return to a position close beside the eye needle. This loop or bight is then braided about the cord 8, the manner in which this operation is formed being illustrated in Figs. 6 and 7. The spoon 15 holds the bight of thread on the opposite side of the cord 8 and while thus held, a braiding needle 25, having the form of a hook is projected above the bight. This needle is advanced far enough to hook over a locking thread 26, which is carried from a supply not shown, and led through an eye 27 in a braider 28 which revolves about the cord 8. The braiding needle is then retracted and meanwhile the end of the spoon is raised by the rotation of a rock-shaft 29 on which it is fixed, the rock-shaft being turned by a cam 30 revolving with the braider and bearing against a trundle-roll 31 on an arm 32, extending from the shaft 29, the cam thereby periodically rocking the shaft. While the spoon is raised and with it the bight of thread, the braiding needle is so far retracted that its point passes under one length of the thread forming the bight, and carries it back to the thread which already has been fastened around the cord. A roll 33 placed adjacent the needle engages its bent-over point or beard and holds it close to its shank so that its point passes under the last previously-secured strand of thread 34 and so braids the locking thread 26 about the thread forming the false reed, tying the same to the cord 8.

In order to keep the threads of the false reed separated and make an open construction, there is provided a lease-rod 35, which extends longitudinally of the machine, between the eye needle and the cord 8, and is given a periodical up-and-down motion. It is arranged so that when the forks carrying a bight of thread are moving toward the cord 8, the length of thread nearest the part of the reed which has been completed, passes over the lease-rod which is then elevated and raises that length of thread, a projection or tooth 36 being formed on the end of the rod to prevent the thread from slipping off. After this, when the loop is formed and passed over the eye needle, the other length of thread forming the bight is carried under the lease rod and thereby kept separated from the upper strands.

Another form of false reed is made in which the threads are crossed instead of being left open, and in order to construct this form it is necessary to have two lease-rods 35 and 35$^a$ placed side by side and laterally separated, as shown in Fig. 17, which are moved up and down simultaneously in opposite directions, one being raised while the other is depressed, so that as the thread is carried across, the stretch thereof nearest the completed part of the reed is placed above one lease-rod and below the other. The relative positions of the lease-rods are then reversed when the loop formed by the knot-maker is passed over the eye needle, so that the other length of thread forming the bight is passed over the second lease-rod and under the first.

The motions described are imparted to the various mechanisms for forming the loop and braiding the bight of thread to the cord 8 by mechanisms similar to those ordinarily used in machines for making loom harness and for that reason are not particularly illustrated or described in the present application.

I claim:—

1. A machine for making false reeds, comprising means for maintaining two side cords in position, means for passing connected lengths of a transverse cord or thread between the side cords progressively from one to the other, and instrumentalities for binding the transverse thread or cord to the side cords.

2. A machine for making false reeds, comprising means for maintaining two side cords in position, means for passing connected lengths of a transverse cord or thread between the side cords progressively from one to the other, and instrumentalities for knotting the stretches of the transverse thread to one of the side cords and braiding them to the other of said cords.

3. A machine for making false reeds, comprising an eye needle having a channel in which is secured a side cord, means for holding a second side cord parallel thereto, carrying means for passing connected lengths or stretches of a continuous thread transversely between said side cords, instrumentalities for making a twsited loop in the thread and passing the same over the end of the eye needle, and instrumentalities for braiding the thread to the second cord.

4. A machine for making false reeds, comprising an eye needle having a channel in which is secured a side cord, and having an eye in its side through which a thread contained in the channel may be drawn, means for holding a second side cord parallel thereto, carrying means for drawing lengths of a continuous thread from said eye and carrying them transversely across to the second cord, knotting instrumentalities for making a twisted loop in a length of the thread and passing the same over the end of the needle and the cord therein, and braiding instrumentalities for tying the lengths of thread to the second cord.

5. A machine for making a false reed comprising an eye needle at one side of the machine having a channel for the reception of a cord and a thread, and having an opening in its side through which the thread may be drawn, provisions for holding and feeding a second cord at the other side of the machine and parallel to said eye needle, a spoon movable in a vertical plane adjacent the second cord, forks movable transversely of the machine for carrying a bight of thread from the eye needle and depositing the same in the hook of the spoon, braiding instrumentalities adapted to carry the bight around said second cord and tie the same thereto with a locking thread, and knotting instrumentalities adapted to form a twisted loop in one length of the thread and pass it over the end of the eye needle.

6. A machine for making a false reed comprising an eye needle at one side of the machine having a channel for the reception of a cord and a thread, and having an opening in its side through which the thread may be drawn, provisions for holding and feeding a second cord at the other side of the machine and parallel to said eye needle, a spoon movable in a vertical plane adjacent the second cord, forks movable transversely of the machine for carrying a bight of thread from the eye needle and depositing the same in the hook of the spoon, braiding instrumentalities adapted to carry the bight around said second cord and tie the same thereto with a locking thread, knotting instrumentalities adapted to form a twisted loop in one length of the thread and pass it over the end of the eye needle, and a lease-rod between the eye needle and second cord having a hook on its end and movable in a vertical plane for separating the lengths of thread.

7. A machine for making a false reed comprising an eye needle at one side of the machine having a channel for the reception of a cord and a thread, and having an opening in its side through which the thread may be drawn, provisions for holding and feeding a second cord at the other side of the machine and parallel to said eye needle, a spoon movable in a vertical plane adjacent the second cord, forks movable transversely of the machine for carrying a bight of thread from the eye needle and depositing the same in the hook of the spoon, braiding instrumentalities adapted to carry the bight around said second cord and tie the same thereto with a locking thread, knotting instrumentalities adapted to form a twisted loop in one length of the thread and pass it over the end of the eye needle, and a plurality of lease-rods arranged between the eye needle and second cord and parallel thereto, each having a hook on its end, and movable up and down in opposite directions, simultaneously, for crossing and separating the lengths of thread, carried across the machine.

8. In a machine of the character specified, an eye needle having a longitudinal channel for the reception of the cord forming one side of a false reed, and a retaining member adapted to hold the end of the cord in the channel.

9. In a machine of the character specified, an eye needle having a longitudinal channel for the reception of the cord forming one side of a false reed, and a spring clip attached to the eye needle in said channel and adapted to have a portion of the cord passed under it and to hold said portion frictionally against the internal surface of the eye needle.

In testimony whereof I have affixed my signature, in presence of two witnesses.

WILBUR E. WINGATE.

Witnesses:
FRANCIS A. MILLS,
HENRY G. EMMONS.